May 31, 1932. C. WELLS 1,860,518
APPARATUS FOR TRANSPORTING AUTOMOBILES
Filed May 18, 1931
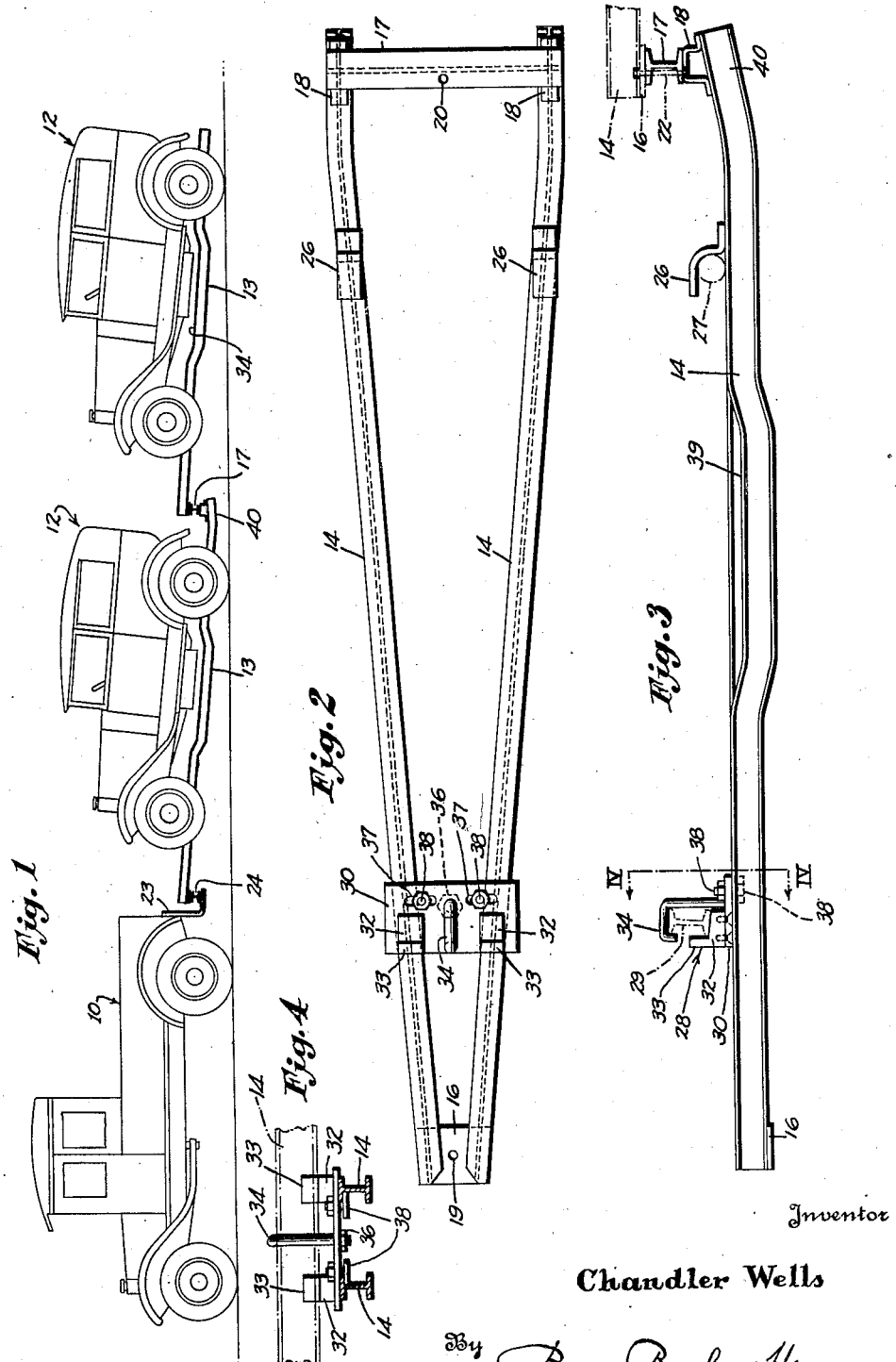
Inventor
Chandler Wells
By Bean, Brooks & Henry.
Attorney Patented May 31, 1932

1,860,518

UNITED STATES PATENT OFFICE

CHANDLER WELLS, OF BUFFALO, NEW YORK

APPARATUS FOR TRANSPORTING AUTOMOBILES

Application filed May 18, 1931. Serial No. 538,343.

This invention relates to tow devices designed to facilitate transportation of motor vehicles and especially new vehicles which are to be shipped from factories or other centers of distribution to sales agencies or the like.

In my co-pending application, Serial No. 510,801, for a method of apparatus for transporting automobiles, filed January 23, 1931, a frame construction is disclosed which facilitates the towing of a train or series of motor vehicles. In this train all the rear wheels engage in the roadway, while the front wheels are elevated to a position sufficiently high to clear all obstacles in the road. Since the frame minimizes the strains and stresses in the transported vehicles, their delivery is facilitated and economically effected.

One object of the present invention is to simplify and improve the type of tow frame disclosed in the prior application mentioned.

Another object of the invention is to provide a series of tow frames which can be attached to motor vehicles and assembled in train formation to insure minimum wear and tear in transporting such motor vehicles.

For a better understanding of the invention, reference may now be had to the accompanying drawings forming a part of this specification on which:

Fig. 1 is a diagrammatic side elevation of a series of motor vehicles provided with tow frames constructed according to the invention.

Fig. 2 is top plan of one of the tow frames.

Fig. 3 is a side elevation of a tow frame, and

Fig 4. is a cross section taken substantially along the lines IV—IV of Fig. 3.

In practicing the invention a transporting truck 10 is provided which is adapted to pull a series of motor vehicles 12 upon tow frames 13. Each frame 13 comprises a pair of side beams 14 and a cross member 16 in the form of a plate secured transversely of the lower surface of the front end of the side beams 14. The rear end of the side beams are connected by means of a cross member 17 in the form of a beam rigidly secured upon brackets 18 carried by the upper surface of the side beams. As best shown by Fig. 2 the side beams converge from the rear end toward the front end of the frame. Openings 19 and 20 formed in the plate 16 and in flanges of the beam 17, respectively, are adapted to receive king pins or coupling bolts 22 for connecting the front end of one frame to the rear end of an adjacent frame as indicated at the rear portion of the arrangement shown by Fig. 3. Likewise the rear end of the transporting truck 10 is provided with a bracket 23 for rigidly supporting a beam 24 that is similar to the beam 17 and is adapted to receive in the same manner one of the coupling bolts 22. This arrangement facilitates the connection on the front end of one of the frames to the rear portion of the truck.

Adjacent their rear ends, the beams 14 are provided with overhanging cleats 26 directed forwardly and designed to engage over the rear axle housing 27 of each of the towed vehicles. This engagement is effected by lifting the rear end of the tow frame until the rear axle housing rests upon the side beams 14 forwardly of the cleats 26 and then moving the vehicle rearwardly or the frame forwardly until the cleats are secured upon the axle housing, thus suspending the rear end of the frame upon the axle housing.

A front axle seat 28 mounted adjacent the forward end of the frame is designed to receive the front axle 29 of one of the towed vehicles. This seat includes a plate 30 secured transversely of the side beams and the axle 29 rests directly upon a pair of blocks 32 having forwardly disposed upright shoulders 33 thereon. An anchoring member 34 preferably in the form of an L-bolt, extends through the plate 30 and is hooked over the front axle 29. Thus the axle is confined firmly against the shoulders 33 as it rests upon the blocks and against the bolt 34 which is tightened as desired by means of a nut 36. In order to provide adjustment of each frame 13 to accommodate vehicles having different wheel bases, the plate 30 is provided with transverse slots 37 for receiving anchoring bolts 38 which are adjustable laterally in the slots with respect to the tow frame. Since the side beams preferably are in the form of I-beams, the heads of the bolts 38 fit firmly against the inner surfaces of the beam flanges and by tightening them at the desired position to receive the axle 29 the proper rigidity of the supporting frame on the vehicle is secured.

When the axle 29 and housing 27 are mounted as shown by Fig. 3 the shoulders 33 prevent the towed vehicle from being displaced forwardly with respect to the frame and the cleats 26 prevent it from being displaced rearwardly. Thus, the frame and towed vehicle are firmly locked together and accidental displacement or disconnection thereof is obviated.

As best shown by Fig. 3 one of the side beams 14 is preferably provided with an intermediate offset portion 39 to accommodate depending parts of the towed vehicle. Also the rear portions of the side beams are deflected upwardly as indicated at 40 for the purpose of providing an elevated position for the cross beam 17 in addition to the elevation provided by the brackets 18. Although the transverse beam is herein illustrated as an I-beam and the openings 20 extend through its opposite flanges, it is evident that the beam may be of any suitable construction and that the opening may extend through only one of the flanges.

In train formation the coupling pin 22 is disposed through the registering openings 19 and 20 of relatively superposed cross members 16 and 17 and practically all longitudinal towing stresses and strains are accommodated by the tow frames, thereby relieving the towed vehicles therefrom. Each tow frame is a unit in itself, it is rigid and therefore durable and is easily mounted upon or demounted from towed vehicles by manipulating the L-bolt 34 with respect to the axle 29 and the cleats 26 with respect to the axle housing 27 as described. After the frames are firmly attached to the vehicle to be towed the front portion of the assembly is lifted by a jack, or other suitable device until the front wheels of the vehicle are free from the ground. Then the coupling pin 22 is inserted in the openings 19 and 20 to secure the front end of one frame to the rear end of an adjacent frame or to the rear end of the truck 10. As many vehicles as desired may be prepared for transportation in this manner. After the vehicles have reached their destination, it is a simple matter to lower the front wheels to the ground and disengage the frames as previously described. By permitting the end of the frame 14 to rest upon the ground after the bolt 34 has been removed, and then moving the vehicle forwardly or drawing the frame rearwardly, the frame is entirely freed from the vehicle.

Although only one form of the invention has been described and shown in detail, it will be apparent to those skilled in the art that the invention is not so limited but that various changes may be made therein without departing from the spirit of the invention or from the scope of the appended claims.

What is claimed is:

1. A tow device comprising a longitudinal frame consisting of rearwardly divergent side members, front and rear cross members joining the forward and rearward ends, respectively, of the side members and each provided with means of connection with the immediately adjacent front and rear vehicles of a train formation, overhanging cleats on the side members adjacent their rear ends and extending forwardly for engaging over the rear axle housing of a vehicle, said cleats engageable with the axle housing upon relative movement between the latter and the side members longitudinally of said side members, a front axle seat on the side members for receiving the front axle of the vehicle subsequent to the engagement of the cleats with the rear axle housing whereby the cleats are locked to the latter, and means for securing the front axle of the vehicle to its seat.

2. A tow device comprising a longitudinal frame consisting of side members, front and rear cross members joining the forward and rearward ends respectively of the side members and serving as means for coupling adjacent tow devices in train formation, cleats on the side members adjacent their rear ends, said cleats overhanging the side members in spaced relation thereto for receiving the rear axle housing of a motor vehicle to suspend the rear portion of the tow device from the rear axle housing, a front axle seat on the side members adjacent their forward ends, and means for securing the front axle of the vehicle to the seat against relative longitudinal movement between the tow device and the vehicle.

3. A tow device comprising an elongated member, means adjacent the rear end of said member for detachably engaging the rear axle housing of the vehicle to be towed, means adjacent the forward end of the vehicle for engaging the front axle of the vehicle and acting to hold said housing engaging means operative, means for securing the front axle of the vehicle in its seat, and means for connecting the tow device to a towing vehicle.

4. A tow device comprising a rigid frame having means for connection to the vehicle to be towed, said frame having parts projecting forwardly and rearwardly from the vehicle for connection in a train, the forwardly extending part of said frame having an under bearing face, and the rearwardly extending part of the frame having an upper bearing face in a plane normally above the under bearing face for supporting the under bearing face of an immediately adjacent tow device in elevated position whereby the adjacent front wheels of the immediately adjacent towed vehicle will be supported thereby off the road.

5. A tow frame construction comprising a series of rigid frames for supporting vehicles to be towed, detachable pivotal connections for securing the front end of one frame to the rear end of an adjacent frame, said connections also being adapted to secure any of the frames to a towing vehicle, and means for rigidly securing the vehicles to be towed upon the frames with their rear wheels only contacting the roadway.

CHANDLER WELLS.